Figures 1, 2:
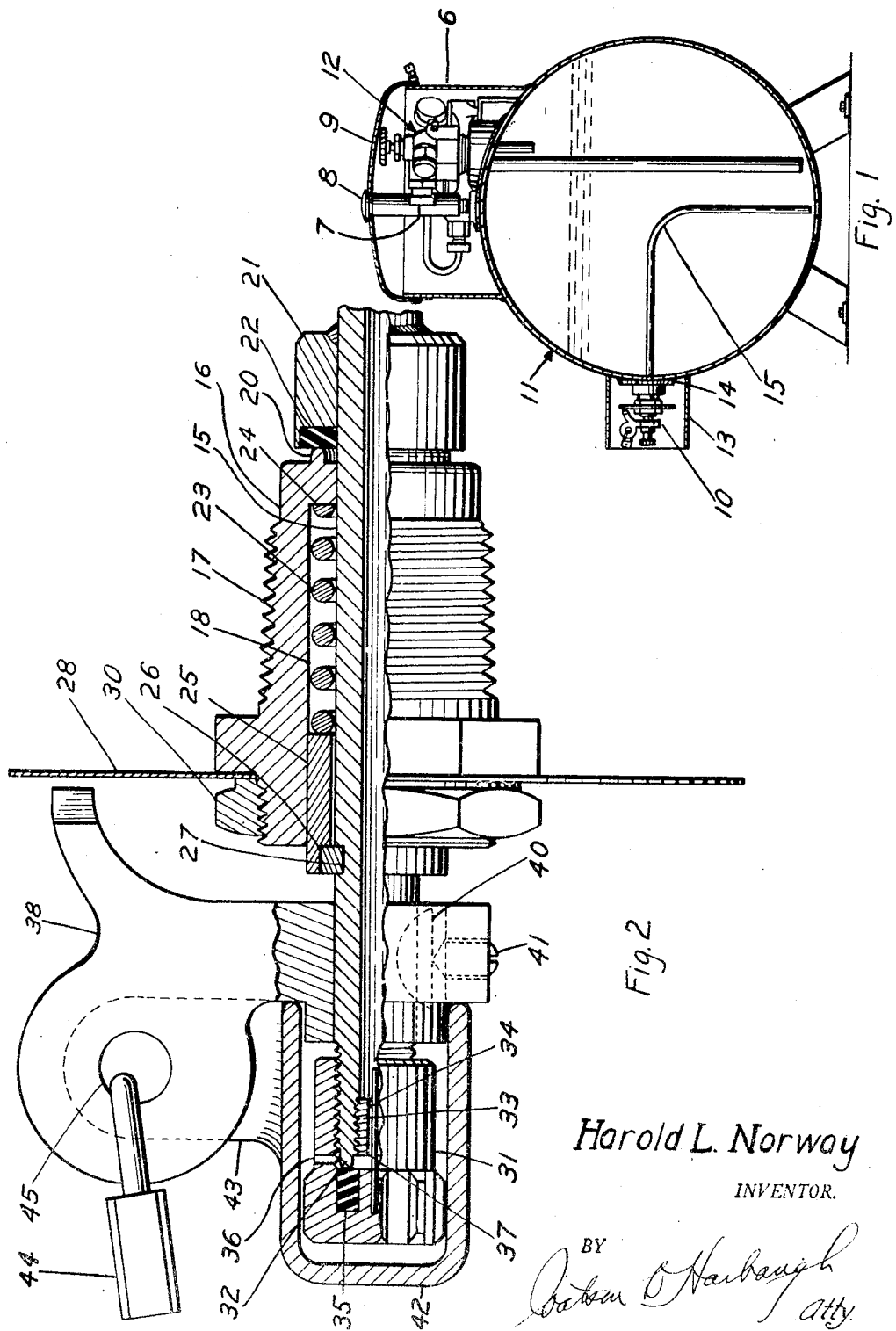

March 27, 1951 — H. L. NORWAY — 2,546,832
LIQUID LEVEL GAUGE
Filed June 5, 1946

Harold L. Norway
INVENTOR.
BY
Atty.

Patented Mar. 27, 1951

2,546,832

UNITED STATES PATENT OFFICE 2,546,832

LIQUID LEVEL GAUGE

Harold L. Norway, Evanston, Ill., assignor to The Bastian-Blessing Company, Chicago, Ill., a corporation of Illinois Application June 5, 1946, Serial No. 674,428

4 Claims. (Cl. 73—298)

1

The invention relates generally to gauges for gauging the liquid level in containers filled with liquefied gas and more particularly to a tamper proof rotary tube gauge having a novel sealing arrangement at the point where the dip tube passes through the container wall.

Liquefied petroleum gases such as butane or propane exert a high vapor pressure at ordinary temperatures and are explosive when mixed with air. When these gases are stored in above ground tanks to be used in home installations in lieu of city gas, it is extremely important that all fittings, piping and gauges be both leak proof and tamper-proof, for any gas leakage will create a fire hazard. Gas leakage in addition to being hazardous is wasteful and quite costly, especially when the tank is filled to a point above the leak and liquid rather than gas escapes.

Rotary dip tube gauges mounted on the side of the storage tank are in general use which are similar in construction to the gauge cock device disclosed in the Tonkin Patent No. 205,152. However, such gauges do not completely fulfill the requirements of safety, for they all are either susceptible to leakage, or are so constructed as to be subject to tampering, or can be partially disassembled from outside the tank by curious or misinformed repair men.

Another disadvantage encountered with gauges in common use occurs when the contents of the tank are contaminated with foreign particles such as rust. These particles collect in the bottom of the tank and, when gauging an almost empty tank, are agitated by the stream of liquid flowing into the dip tube and swept into the gauging device. Here they either clog the tube of the bleed-test valve or are deposited on the valve seat so that the valve cannot be closed.

One object of this invention is, therefore, to provide a rotary dip tube gauge having a novel type sealing element which will positively prevent leakage of gas.

A second object is to provide a gauging device which will be tamperproof.

Another object is to provide a gauge which will not become inoperative if foreign matter is present in the tank.

Further objects and novel features will be apparent to those familiar with the art on examination of the specification, the claims and the accompanying drawing in which:

Fig. 1 is an overall view of the embodiment of this invention installed in a tank, and Fig. 2 is an enlarged fragmentary section of a portion of the gauge.

2

In Fig. 1 an embodiment of this invention 10 is shown installed in the side of a cylindrical tank 11 for liquefied petroleum gas. The group of fittings 12 at the top of the tank provides a means for filling the tank and withdrawing liquid as it is required.

A protective cover 9 is secured to a cylindrical enclosure 6 and completely surrounds the fittings 12. This serves to make the installation tamperproof for a padlock may be used to hold the cover in place. The cover 9 is provided with a loosely fitting blow cap 8 disposed directly above the safety valve 7. In the event the safety valve 7 is opened due to excess pressure in the tank 11 the cap 8 will be blown off and gas pressure will not build up within the enclosure 6.

A second cylindrical enclosure 13 is shown welded to the side of the tank 11 partially enclosing the external parts of the gauge 10. A flange 14 is provided in the wall of the tank 11 for installing the gauge 10, and the rotatable dip tube 15 extends through the opening in this flange 14 to a point adjacent to the bottom of the tank 11.

In Fig. 2 the construction of that portion of the gauge, which mounts on the wall of the tank 11, is shown in an enlarged view. The elongated body 16 is provided with a thread 17 so that it may be screwed into the opening in the flange 14. The end of the dip tube 15 extends through a hole 18 in the body 16. The inward end of the body 16 is provided with a seat 20 against which bears a collar 21 which holds a valve seat 22 in the form of a ring. The collar 21 is soldered on the dip tube 15 so as to form a gas tight joint. A spring 23 is provided inside the body 16. One end of this spring 23 bears against a shoulder 24 on the body 16, and the other end bears against a second collar 25 which is held against outward displacement by a C-ring 26 seated in a groove 27 in the dip tube 15. An indicator dial 28 is fastened to the body 16 by a lock nut 30.

The end of the dip tube 15 which extends outside the body 16 is externally threaded to receive the valve cap 31, and a valve seat 32 is provided on the end of the tube 15. An internal thread is also provided in the end of the tube to receive a restrictor 33 having narrow passage 34 therethrough. The threaded valve cap 31 is provided with a sealing ring 35 which makes a seal with the valve seat 32 when the cap 31 is screwed tight. A bleed hole 36 is drilled through the cap into the cavity within. When the cap 31 is unscrewed, this hole 36 constitutes an exit passage for the liquid or gas. A clean out pin 37 is fixed to the cap 31 so as to extend into the passage 34.

Between the end of the tube 15 and the body 16 an indicator arm 38 is attached to the shaft by means of a key 40 and a set screw 41. A protective cover 42 is shown in place over the cap 31. An arm 43 which extends from the side of this cover is provided with a hole which corresponds with a hole in the arm 38 so that a padlock 44 may be used to secure the cover 42 in place.

The operation of this invention is as follows:

When it is desired to gauge the height of liquid in the tank 11 the cover 42 is first unlocked and removed. The dip tube 15 is then rotated by means of the indicator arm 38 until the end of the tube extends upward to the top of the tank 11. The cap 31 is slightly unscrewed allowing gas to flow from the tank 11 through the dip tube 15 past the valve seat 32 and out the small hole 36. The dip tube 15 is then rotated slowly by the arm 38 until the end of the tube 15 reaches the top of the liquid. At this point liquid rather than gas will sputter and flow out the hole 36. The position of the arm 38 with respect to the dial 28 can now be read, and a measure of the volume of liquid in the tank 11 obtained.

The dial 28 may be graduated in any convenient method such as fractions of tank filled, gallons, percent filled, etc. If a dial is graduated for one cylindrical tank in fraction or percent filled, it can be used on any cylindrical tank. A different fractional dial may be used for any spherical tank.

Among the features of novelty of this invention which makes it superior to other dip tube gauges is the fact that a gauge constructed as illustrated is absolutely tamper-proof and may be used on tanks installed in the open without danger of its being opened by unauthorized persons. Further it would be extremely difficult for anyone unfamiliar with the construction of this gauge to disassemble it out of curiosity, for he would have to remove many parts and then force the collar 25 inward using a special tool to remove the locking ring 27. Even after he had done this, gas pressure within the tank would hold the sealing ring 22 against the seat 20. These two facts are important from the point of view of safety.

A further advantage lies in the fact that the rotating seal seat 20 is located on the inward end of the body 15 integral with the body rather than on a bushing screwed to the body 15 as has been done in prior gauges. By this superior arrangement it is impossible for liquid or gas to leak through the bushing threads and escape. The only way which liquid or gas can possibly escape is to leak through the seal itself and such leakage is unlikely. The gas pressure as well as the force exerted by the heavy spring tends to force the sealing ring tightly against the seat member.

The clean-out pin 37 in the cap 32 will keep the hole 34 in the restrictor 33 clear at all times even if the contents of the tank are dirty. If particles stick to the valve seat 32 or disc 35 the dip tube 15 may be rotated so that the inward end is above the liquid level and the cap 31 quickly removed, cleaned and reinstalled before an appreciable quantity of gas escapes.

Various changes and modifications may be made without departing from the spirit of the invention whose scope is defined by the following claims.

What is claimed is:

1. A rotary liquid level gauging device comprising an elongated body having an opening therethrough and adapted to be supported in the wall of a liquefied gas container, a seat member on the inward end of said body, said seat member being integral with said body, a rotatable dip tube extending into said container through said opening and having a circumferential groove thereon, a sealing element supported by a collar attached to said tube and disposed so as to bear against said seat member, an internal shoulder on said body, a spring for urging said sealing element toward said seat member, said spring being disposed about said tube within said elongated body and bearing against said internal shoulder and a second collar, said second collar being secured to said dip tube by a locking ring disposed in said circumferential groove in said tube, valve means for controlling the flow of gas through said tube, and means for indicating the rotative position of said tube.

2. A rotary liquid level gauging device comprising an elongated body having an opening therethrough and adapted to be supported in the wall of a liquefied gas container, said body having a seat member on its inward end, said seat member being integral with said body, a rotatable dip tube extending into said container through said opening and having a circumferential groove thereon, a sealing element supported by a collar attached to said tube and disposed so as to bear against said seat member, an internal shoulder on said body, a spring for urging said sealing element toward said seat member, said spring being disposed about said tube within said elongated body and bearing against said internal shoulder and a second collar, said second collar being slidably mounted in said tube, a locking ring disposed in said circumferential groove in said tube, said ring preventing outward movement of said collar, valve means for controlling the flow of gas through said tube, and means for indicating the rotative position of said tube.

3. In a device of the class described, a liquid level gauge comprising an elongated body adapted to be supported in the wall of a container and having an opening therethrough into said container, a rotatable dip tube extending through said opening into said container, a collar fixed to said dip tube disposed at the inward end of said body, a seat member integral with said body on the inward end of said body, a sealing ring carried by said collar and disposed so as to form a seal with said seat member, an internal shoulder in said body, a second collar attached to said dip tube, a spring for urging said collar against said seat member disposed about said dip tube within said elongated body and bearing against said internal shoulder in said body and said second collar, a valve on the outward end of said dip tube, and means for indicating rotation of said dip tube.

4. In a device of the class described, a liquid level gauge comprising an elongated body adapted to be supported in the wall of a container and having an opening therethrough into said container, a rotatable dip tube extending through said opening into said container, a support means fixed to said dip tube disposed at the inward end of said body, a sealing member integral with said body on the inward end of said body, a sealing ring disposed between said support means and said sealing member to form a seal, an internal shoulder in said body, a collar attached to said dip tube, a spring for urging said support means toward said sealing member disposed about said dip tube within said elongated body and bearing against said internal shoulder in said body and said collar, a valve on the outward end of said dip tube, and means for indicating rotation of said dip tube.

HAROLD L. NORWAY

REFERENCES CITED

The following references are of record in the file of this patent:

UNITED STATES PATENTS

| Number | Name | Date |
|---|---|---|
| 157,583 | Cummings | Dec. 8, 1874 |
| 213,669 | Leger | Mar. 25, 1879 |
| 622,969 | Murphy | Apr. 11, 1899 |
| 1,287,698 | Kiley | Dec. 17, 1918 |
| 1,294,568 | Tajima | Feb. 18, 1919 |
| 2,267,221 | Roney | Dec. 23, 1941 |
| 2,448,816 | May | Sept. 7, 1948 |

FOREIGN PATENTS

| Number | Country | Date |
|---|---|---|
| 279,951 | Italy | Nov. 26, 1930 |